United States Patent [19]

Sterler et al.

[11] Patent Number: 4,985,835
[45] Date of Patent: Jan. 15, 1991

[54] METHOD AND APPARATUS FOR ACTIVATING A MOTOR VEHICLE SAFETY SYSTEM

[75] Inventors: Georg Sterler, Grossmehring; Heinz Bader, Karlshuld, both of Fed. Rep. of Germany

[73] Assignee: Audi AG, Fed. Rep. of Germany

[21] Appl. No.: 300,894

[22] Filed: Jan. 24, 1989

[30] Foreign Application Priority Data

Feb. 5, 1988 [DE] Fed. Rep. of Germany ....... 3803426

[51] Int. Cl.$^5$ .............................................. B60R 21/08
[52] U.S. Cl. .............................. 364/424.05; 340/669; 280/735; 180/282
[58] Field of Search ............... 364/565, 424.01, 424.05; 280/734, 735, 748, 806; 340/669; 180/282

[56] References Cited

U.S. PATENT DOCUMENTS

| | | | |
|---|---|---|---|
| 3,911,391 | 10/1975 | Held et al. | 340/669 |
| 4,154,472 | 5/1979 | Bryll | 290/65 A |
| 4,243,248 | 1/1981 | Scholz et al. | 280/735 |
| 4,243,971 | 1/1981 | Suchowerskyi et al. | 340/438 |
| 4,381,829 | 5/1983 | Montaron | 180/274 |
| 4,410,875 | 10/1983 | Spies et al. | 280/735 |
| 4,497,025 | 1/1985 | Hannoyer | 364/424.01 |
| 4,608,501 | 8/1986 | Andres et al. | 180/282 |
| 4,638,179 | 1/1987 | Mattes et al. | 280/735 |
| 4,784,237 | 11/1988 | Condne et al. | 180/268 |
| 4,836,024 | 6/1989 | Woehrl et al. | 73/514 |
| 4,864,202 | 9/1989 | Nitschke et al. | 318/560 |

Primary Examiner—Thomas G. Black
Attorney, Agent, or Firm—Lalos & Keegan

[57] ABSTRACT

An improved method for determining when an automotive safety system should be released. The improved method calculates and predicts the movement of dislocation of the driver from the seated position at a predetermined time in the future based upon signals provided from one or more acceleration sensors.

7 Claims, 2 Drawing Sheets ns of the present invention for evaluating the accelerator signal.

METHOD AND APPARATUS FOR ACTIVATING A MOTOR VEHICLE SAFETY SYSTEM

This invention relates to motor vehicle safety systems and particularly to an improved method and apparatus for activating the safety system in the event of an accident.

In the past, the primary system for insuring occupant safety in automobiles has been seat belts. However, the most effective system currently available to the general public is the airbag system. The airbag safety system is automatically actuated without the need for operator action. The air cushion is automatically inflated when the vehicle stops suddenly, usually due to impact with another vehicle. Such collisions normally cause the vehicle passenger to be thrown forward and the airbag provides an air cushion between the passenger and the vehicle steering wheel or windshield. Airbags are normally installed beneath the steering column to catch the passenger being thrown forward upon collision. In addition to airbags installed in the forward compartment, side air cushions can also be installed at the upper edge of the door or at the front roof supports to protect passenger against sudden lateral movement within the vehicle caused generally by side collisions. In addition to airbags, automatically activated seat belt and shoulder strap tensioners are also installed on many vehicles.

Each of the safety devices must be automatically activated in the event of an accident, thus requiring an analysis of events and determination of when such safety systems should be activated. This analysis and determination requires the motion of the vehicle and/or the passengers to be sensed. This determination is usually made utilizing acceleration sensors, such as piezoelectric impact transducers, that generate an electric signal proportional to very positive or negative accelerations. This signal is generally evaluated to determine if the vehicle is decelerating at a rate that would warrant release or activation of the safety system. Examples of such systems are disclosed in U.S. Pat. Nos. 4,638,179, 4,608,501, 3,911,391, 4,243,971, and 4,410,875.

Typically, in determining whether or not to activate the safety system the acceleration signal is integrated to form a velocity signal, the height or magnitude of which is compared to a predetermined threshold value. The safety system is activated if the threshold value is exceeded. Threshold values, both for the acceleration signal as well as the determined velocity signal, are predetermined using crash tests. Such systems may prove inadequate in that the time progression of the acceleration signal is not fully evaluated. Such prior art evaluations may be inadequate, for example, if the threshold values determined in crash tests have been made on the basis of collisions against rigid barriers. Then, the determined threshold values may not be reliable in the event of collisions against less rigid structures such as small trees or poles that may yield when struck by a moving vehicle. In such instance, the release function of the safety system may be imprecise so as to jeopardize operator safety.

Accordingly, it is an object of the present invention to provide an improved method for evaluating events occurring during vehicle accidents. A further object of the invention is to provide an improved method for determining when the vehicle safety system should be released.

Another object of the present invention is to provide a precise evaluation of the accelerator signal for accurately controlling the release function of the safety system.

DETAILED DESCRIPTION

Figure 1:
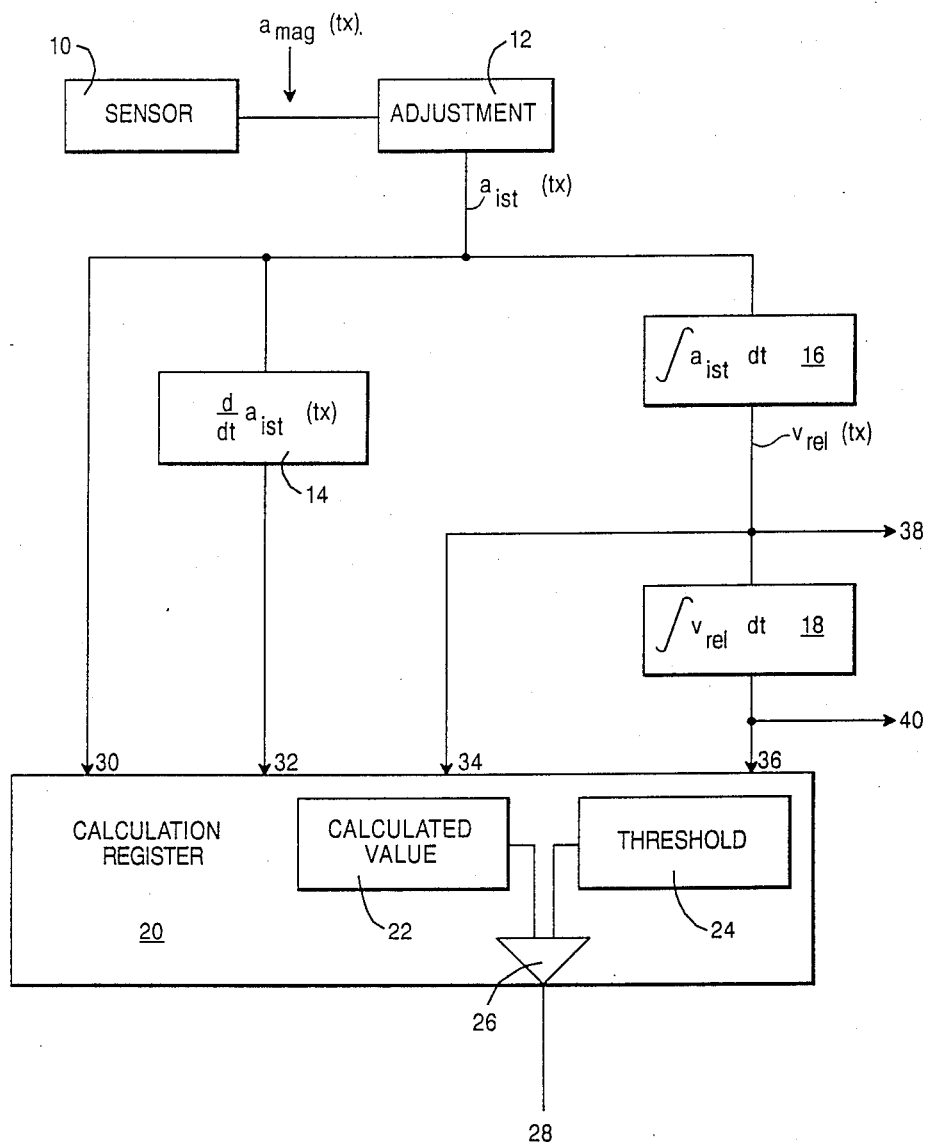
FIG. 1 is a schematic representation of the components of the present invention for evaluating the accelerator signal.

In the method of the present invention release of the safety device is not based solely o the acceleration and velocity signals as determined in prior systems. In contrast, through further evaluation of the accelerometer signal and based upon the principles of inertia, the path and initial movement of the vehicle passengers is calculated upon any sudden deceleration of the vehicle caused, for example, by a collision. If the initial movement of the passengers exceeds a predetermined threshold value then the projected position of the passengers will indicate that the passengers will come into contact with the steering wheel, windshield or other components within the interior of the motor vehicle. When the projected movement or future location of the passengers indicates injury, the safety system is activated. For example, the airbag is inflated.

The warning signal which is derived by the method of the present invention and which expresses the initial movement or dislocation of the passengers is calculated several times in very brief periods. The safety system may be activated only if the threshold value is exceeded during at least two consecutive time intervals. This prevents sudden but brief decelerations from releasing the safety system. Such temporary decelerations may be caused by hitting bumps or quick but temporary braking.

The output signal from a conventional piezoelectric sensor serves as the measurement of acceleration/deceleration in the present invention. The remaining values used in the method of the present invention are determined through integration and/or differentiation of the acceleration signal.

In the method of the present invention the following formula is used to calculate the projected location of the passenger based upon the passenger's initial position and the acceleration signal provided by the acceleration sensor.

$$S_I(t_x + z) = K1 \cdot S_I(t_x) + K2 \cdot v_{rel}(t_x) \cdot z + K3 \cdot a(t_x) \cdot \frac{z^2}{2} + K4 \cdot \frac{da(t_x)}{dt} \cdot \frac{z^3}{3}$$

where:
$t_x$ = time x
$z$ = activation time of the safety device
$a(t)$ = acceleration sensor signal at time t
$v_{rel}$ = Relative velocity, calculated by integration of a(t)

$S_f(t)$ = projected position of the passengers at time t (calculated by doubled integration of acceleration sensor signal)

$K_1$–$K_4$ = evaluation factors

The position of the passengers within the vehicle as a function of time is given by the position formula of the present invention, described above. In this formula the variable z is the period of time required to activate the safety system, for example, inflation of the airbag. This time period, z, must be predetermined through routine experimentation. Using the position formula, the position of the passenger at time $t_x + z$ is predicted. This position is calculated from the position of the passenger at time $t_x$, the velocity, the acceleration, and the first derivation of the acceleration according to time. These values are all calculated through integration or differentiation of the acceleration sensor signal. The various evaluation factors K1–K4 are used to weigh the individual addends of the formula.

Evaluation factors K1–K4 are constants, predetermined through routine simulations and actual crash tests. The value of these constants depend, in part, on the location of the sensor, the location of the driver/passenger, and the geometry of the vehicle itself, especially the physical location of the steering wheel (containing the airbag). These factors will be different for each vehicle type but can be derived empirically by vehicle manufacturers using standard crash tests and simulations. Typical values for these evaluation factors, as determined by applicant, are 1.0 for K1, 1.0 for K2, 0.3 to 1.5 for K3, and 0.3 to 1.5 for K4.

In applying this formula by the method of the present invention, the passenger is considered as a freely movable mass in relation to the vehicle. However, a more precise calculation can be made by considering other factors such as resistance to forward motion of the driver caused by holding the steering wheel, the spring action of the driver's seat, etc. These factors can be taken into consideration in such a way that will describe the position or movement of the passengers as a mass-spring system rather than as a freely movable mass. Thus, in order to arrive at the most precise description of the passenger movement, the evaluation factors or constants cannot be assumed as linear. Persons having ordinary skill in the art can thus enhance the precision of the position formula of the present invention without departing from the spirit or scope of the present invention.

With the method and apparatus of the present invention, a second acceleration sensor can also be provided to measure transversal acceleration of the vehicle. The second sensor being mounted at 90° relative to the first or primary sensor. It is thereby possible to calculate the relative position and relative direction of the passengers and to predict their future position more precisely. The position of the passengers at time $t_x$ and future position at time $t_x + z$ is calculated from the two sensor signals and the results added vectorially. The safety system release threshold is no longer a scalar but has a directional characteristic. Further, the release of individual safety devices, for example, door air pillows versus steering column airbags, can be selected depending on the projected direction of travel of the passenger.

The calculation of the movement or location of the passenger can be further optimized by taking into account whether or not the passengers have fastened their seat belts and whether the vehicle includes additional safety systems, such as the mechanical safety system sold under the trademark PROCON-10.

Referring to FIG. 1, a safety circuit for utilizing the method of the present invention includes a sensor 10, i.e. a piezoelectric acceleration sensor, that produces an acceleration signal at any given time $t_x$ that is dependent on the magnitude of acceleration. Conventional adjustment circuit 12 (e.g. operational amplifier) is connected to the output of sensor 10 to provide a modified acceleration signal $a_{ist}(t_x)$ that will reflect the acceleration or deceleration of the car and yet be in the form that is suitable for processing by the remaining circuitry. Specifically, the adjustment circuit 12 will form a rectangular pulse $a_{ist}(t_x)$ from the sensor 10 acceleration signal $a_{mag}(t_x)$. The acceleration signal $a_{ist}(t_x)$ is utilized by the remaining circuitry shown in FIG. 1 to implement the method of the present invention according to the position formula previously described. The acceleration signal $a_{ist}(t_x)$ is provided as an input to calculation register 20 (i.e. a microprocessor), a conventional differentiator circuit 14, and a conventional integrator circuit 16.

The output of the differentiator circuit 14 is fed to input 32 of calculation register 20. The output of integrator circuit 16 represents the acceleration signal integrated over time, yielding velocity signal $v_{rel}(t_x)$. This velocity signal is fed directly into input 34 of calculation register 20 and to another integrator circuit 18. The output of integrator circuit 18 is the velocity signal integrated over time, and thus represents the distance or path traveled over a given time period, $t_x$. This distance signal is fed into input 36 of calculation register 20. The velocity signal and distance signal are shown as also connected to additional outputs 38 and 40, respectively, which outputs are used for additional monitoring not related to the invention described herein.

The calculation register 20, i.e. a microprocessor, is programmed in a conventional manner to calculate, from the signals received on input lines 30, 32, 34, and 36, the projected location of the passenger at time $t_x + z$ according to the position formula previously described. The constants K1 through K4 are prestored in the calculation register in a conventional manner and used in the formula to arrive at the calculated value that is stored, for example, in a register 22. The predetermined threshold value for the projected distance traveled by the passenger is stored in register 24, for example. The calculated value and threshold value are compared by comparator 26. If the calculated value stored in register 22 exceeds the threshold value stored in register 24, the comparator 26 produces a signal at its output 28 that in turn is used to activate the safety device, for example, triggering the inflation of the airbag. The calculation register 20, i.e. microprocessor, can be programmed in a conventional manner to generate the output signal only if the calculated value exceeds the threshold value for two consecutive samples of the accelerator signal or during two consecutive time intervals in which the position value is calculated.

Figure 2:
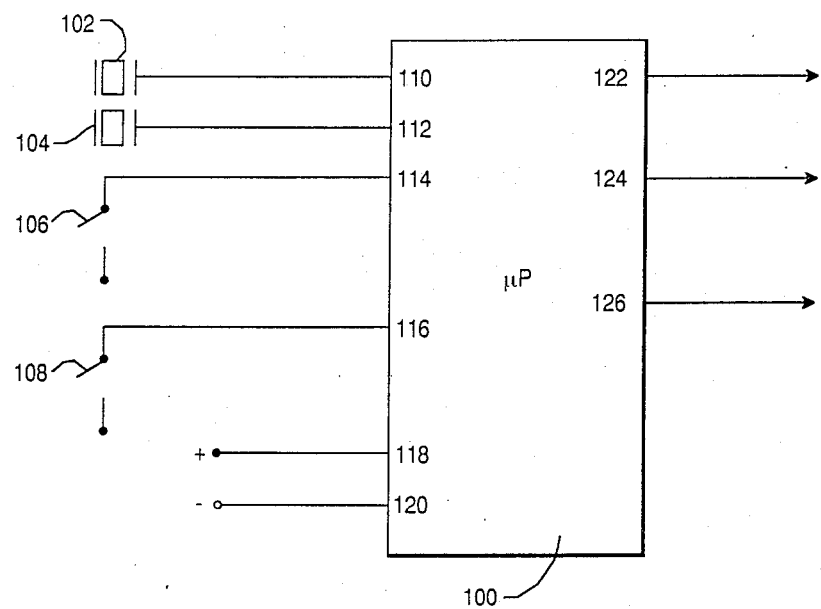
FIG. 2 is a general block diagram of a microprocessor or microcomputer used in the present invention for conducting the signal evaluation and providing control signals.

Referring to FIG. 2, the adjustment circuit, differentiator circuit, integrator circuits, and calculation register can be implemented using a standard microcomputer that is represented generally as 100. Using the microcomputer 100, multiple sensors can be monitored to provide an appropriate warning signal or triggering signal. A first acceleration sensor 102 provides its signal at input 110 of the microcomputer. A second acceleration sensor 104 delivers its signal at input 112. The two acceleration signals 102 and 104 are mounted at right angles to one another so as to provide a more precise directional indication of the projected location of the passenger at a given time in the future. The microcomputer 100 can be programmed in a conventional manner to operate on the acceleration signals as vectors rather than scalars in calculating the projected position of the vehicle passenger according to the position formula of the present invention.

Additional factors can be incorporated into the calculation utilizing switches 106 and 108. For example, switch 106, connected to input 114 of microcomputer 100, can be used to indicate whether the driver and/or front seat passenger have fastened their seat belt. A separate switch 106 can be provided if an indication of the passenger seat belt is to be analyzed separately.

The seat belt inputs can be used to appropriately modify the threshold value. If, for example, the seat belts are fastened, then the threshold value for releasing the airbag can be raised. If the seat belts are not fastened, the threshold would be set lower. Similarly, switch 108 can be used to indicate whether the car is equipped with additional safety features such as the standard PROCON-10 system. If the car is equipped with the PROCON-10 system, the threshold for releasing the airbag can be raised. PROCON-10 is normally a safety system that is installed when a car is being manufactured. Therefore switch 108 can be preset, whereas the seat belt inputs will depend on use by the vehicle driver and/or passenger. The amount that the threshold can be raised or lowered will depend on the type of secondary safety system used and the type of car itself. The threshold value is derived through standard crash tests or simulations.

The microprocessor 100 will provide outputs generated as a result of the calculation described herein. An output 22, for example, can be used to trigger the airbag for the driver. An output 124 can be used to trigger an airbag for the front seat passenger, and output 126 can be used to control the other safety devices, if provided, for example, door air pillows. Additional outputs can be provided if necessary.

We claim:

1. A method for activating a motor vehicle safety system comprising:
   measuring the deceleration of said vehicle and producing an acceleration signal indicating the magnitude of said vehicle deceleration;
   calculating from said acceleration signal the projected position of a passenger of said vehicle due to said deceleration in accordance with the following formula:

$$S_I(t_x + z) = K1 \cdot S_I(t_x) + K2 \cdot v_{rel}(t_x) \cdot z + K3 \cdot a(t_x) \cdot \frac{z^2}{2} + K4 \cdot \frac{da(t_x)}{dt} \cdot \frac{z^3}{3}$$

where:
   $t_x$ = time x
   z = activation time of the safety device
   a(t) = acceleration sensor signal at time t
   $v_{rel}$ = relative velocity, calculated by integration of a(t)
   $S_I(t)$ = projected position of passengers at time t (calculated by doubled integration of the acceleration sensor signal.)
   $K_1$–$K_4$ = evaluation factors;
and
   activating said safety system if said calculated projected position of said passenger exceeds a predetermined threshold value.

2. A method according to claim 1 wherein said deceleration is measured over at least two consecutive time intervals and said safety system is activated if said calculated projected position exceeds said threshold value for said at least said two time intervals.

3. A method according to claim 2 wherein said projected position is calculated through differentiation and integration of said acceleration signal.

4. A method according to claim 2 wherein deceleration of said vehicle is measured by sensing both the longitudinal and transversal components of deceleration to produce a combined acceleration signal indicating magnitude and direction of vehicle deceleration.

5. A method according to claim 1 wherein said projected position is calculated through differentiation and integration of said acceleration signal.

6. A method according to claim 5 wherein deceleration of said vehicle is measured by sensing both the longitudinal and transversal components of deceleration to produce a combined acceleration signal indicating magnitude and direction of vehicle deceleration.

7. A method according to claim 1 wherein deceleration of said vehicle is measured by sensing both the longitudinal and transversal components of deceleration to produce a combined acceleration signal indicating magnitude and direction of vehicle deceleration.

* * * * *